Sept. 19, 1961     D. E. WILCOX ET AL     3,001,093
LOW SPEED SYNCHRONOUS MOTOR

Filed Aug. 30, 1956     3 Sheets-Sheet 1

INVENTORS
DOYLE E. WILCOX
JOSEPH A. MEHM
BY *Frederic B. Schramm*

ATTORNEY

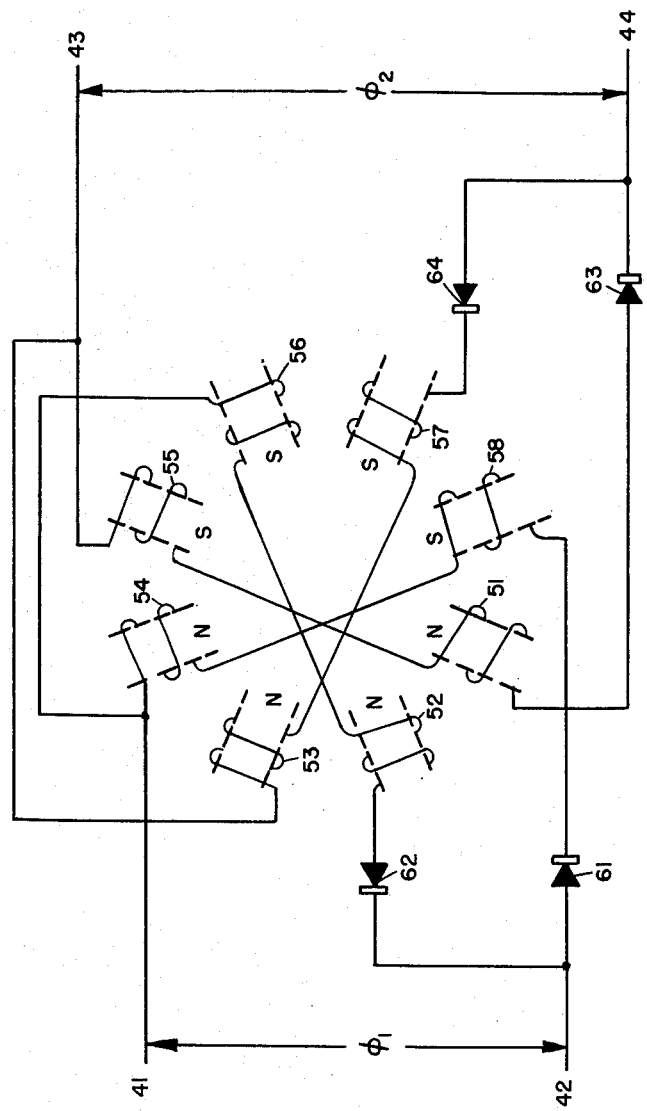

Sept. 19, 1961 D. E. WILCOX ET AL 3,001,093
LOW SPEED SYNCHRONOUS MOTOR
Filed Aug. 30, 1956 3 Sheets-Sheet 3

INVENTORS.
DOYLE E. WILCOX
JOSEPH A. MEHM
BY
ATTORNEY

United States Patent Office 3,001,093
Patented Sept. 19, 1961

3,001,093
LOW SPEED SYNCHRONOUS MOTOR
Doyle E. Wilcox, Puente, and Joseph A. Mehm, Huntington Park, Calif., assignors to North American Aviation, Inc.
Filed Aug. 30, 1956, Ser. No. 607,221
5 Claims. (Cl. 310—158)

This invention relates to dynamoelectric apparatus and concerns particularly apparatus of the inductor type.

Efforts to obtain lower speeds of output shafts driven by synchronous alternating current motors have encountered difficulties, such as greatly increased weight and cost per horsepower whether speed reduction is accomplished by interposing reduction gearing or designing motors with greater numbers of poles. Frequency changers to provide special lower frequency circuits also introduce higher cost and weight. Doubling the number or poles, for example, to make the synchronous speed half as great without loss of horsepower requires making the diameter about twice as great and weight and cost about four times as great. The weight problem alone is of great consideration on aircraft where the weight of motor driven auxiliaries must be maintained at a practical minimum.

It is accordingly an object of the invention to provide synchronous rotating machinery of lower speed without significant increase in cost or number of parts.

A specific object of the invention is to provide improved, compact, rugged, reliable alternating-current rotating apparatus for operation at low speeds in relation to frequency.

A further object of the invention is to provide apparatus capable of operation at low speeds on 400-cycle circuits and suitable for use on aircraft.

Another object of the invention is to provide a low speed, high torque, high efficiency synchronous motor.

Another object of the invention is to provide a synchronous motor which is self-starting on high-frequency circuits as well as low-frequency circuits.

Still another object of the invention is to provide a slow speed motor with a minimum of external control or equipment.

Other and further objects, features and advantages of the invention will become apparent at the description proceeds.

In carrying out the invention in accordance with a preferred form thereof, a salient pole field structure is utilized with eight poles or a multiple thereof and a field coil on each pole. Two-phase excitation is employed with alternate coils connected to the same phase and rectifiers connected to the field coils in such a manner that half the coils in each phase are connected with one polarity and the other half with the opposite polarity. A slotted rotor is provided and the pole faces are slotted with the same slot pitch as the rotor. The pole face slots of each pole are displaced from those in the next pole face so that when the rotor slots are in alignment with those of one pole face, they are out of alignment by a quarter slot pitch under the next pole face. Preferably, the rotor is mounted on a shaft with some freedom of relative angular motion thereto for facilitating self-starting at high excitation frequencies. For excitation by three or more phases the slot displacement is modified accordingly.

A better understanding of the invention will be afforded by the following detailed description considered in conjunction with the accompanying drawings, in which:

FIG. 3 is a circuit diagram of the field windings of the motor illustrated in FIGS. 1 and 2;

Like reference characters are utilized throughout the drawing to designate like parts.

Figure 2:
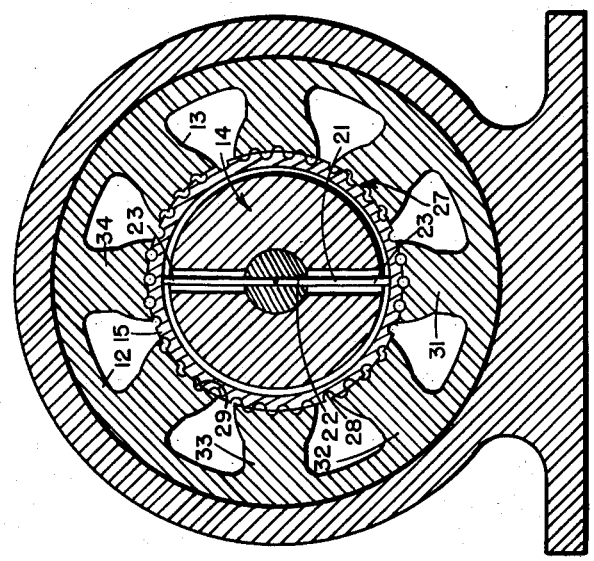
FIG. 2 is a cross-sectional view of the motor of FIG. 1.
Figure 1:
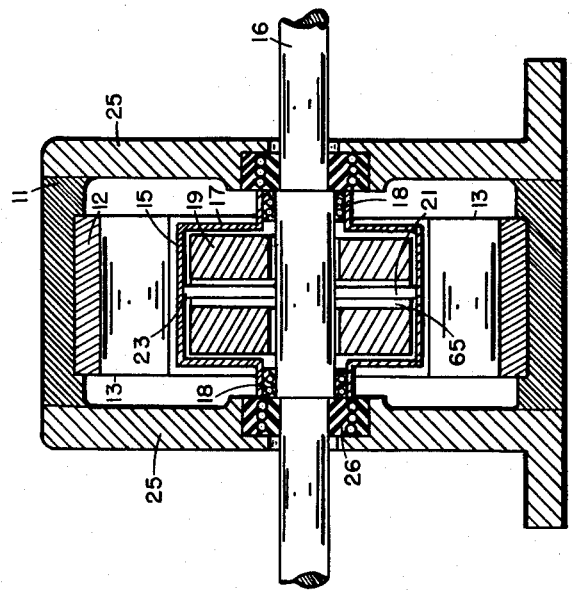
FIG. 1 is a longitudinal sectional view of a motor constituting an embodiment of the invention.

Referring now to FIGS. 1 and 2 of the drawing, a motor housing 11 is provided in which is secured a field structure 12 preferably composed of punched laminations formed with salient poles indicated generally as 13. There is a rotor 14 comprising a shell 15 composed of magnetizable material, such as soft iron, mounted upon a shaft 16. For enabling the rotor shell 15 to be connected to the shaft 16 side plates 17 are provided which are rotatably mounted upon the shaft 16 by auxiliary bearings 18. For reducing the reluctance of the magnetic path across the diameters between the poles 13 a cylindrical member or rotor core 19 composed of soft iron or other magnetizable material is loosely mounted upon the shaft 16. A spring member 21 composed of spring-steel, or the like, is secured in a transverse opening 22 of the shaft 16 and welded or otherwise secured at the ends 23 to the inner surface of the rotor shell 15. The motor housing 11 is provided with end bells 25 carrying the main bearings 26 supporting the shaft 16 of the rotor 14.

As shown in FIG. 2, the poles 13 are provided with pole faces 27 of increased angular width about the axis of revolution of the rotor. Both the rotor shell 15 and the pole faces 27 are axially slotted so as to provide rotor slots 28 and pole face slots 29. The slot pitch or spacing from one slot to the next is made a fraction of the pole pitch so that there may be a plurality of slots in each pole face. Moreover, the spacing or separation between adjacent pole faces is made of the same order of magnitude as the slot pitch. In the particular arrangement illustrated with eight salient poles, the spacing between pole faces is three-fourth slot pitch so that each pole is displaced a fourth slot pitch with respect to the adjacent pole.

Although the slot pitch of the rotor shell 15 is made uniform around the periphery thereof, the slots in the pole faces are thus displaced from each other in successive pole faces. In the case of an eight pole machine for two-phase excitation, as illustrated, going from one pole face to the next around the periphery of the machine the pole face slots are displaced one-fourth slot pitch. For example, in the case of the pole 31 for a given position of the rotor the slots are in alignment but the rotor and the pole face slots are partially displaced in position at pole 32. At the pole 33 the slots are displaced further again so that the slots of the pole face are in alignment with the teeth of the rotor. However, in the pole 34, which is four poles away from the pole 31 and of opposite polarity, the slots in the pole face and in the rotor are again in alignment.

In the eight pole two-phase machine the angular phase relationship between slots in successive poles is 90° (electrical) so that for every four poles the same angular relationship is repeated. On the other hand, in the case of a three-phase twelve-pole machine there would be a 60° displacement of slots from pole face to pole face and every sixth pole would have the angular relationship repeated. Thus, the fraction of the slot pitch representing the displacement in slots from one pole face to the next is the reciprocal of twice the number of phases and the number of salient poles is four itmes the number of phases.

To avoid confusion in the drawing, the windings have not been shown in FIG. 2 but the windings consist of a single coil for each salient pole, as illustrated diagrammatically in FIG. 3. As shown, in the case of two-phase excitation, the field coils are divided into two groups: one group connected to phase 1 having alternating-current terminals 41 and 42, and the other group connected to phase 2 having alternating-current terminals 43 and 44. The coils connected to one phase alternate with those connected to the other phase. In the case of an eight-pole machine there are eight coils 51–58, inclusive. Coils 51, 53, 55 and 57 are connected to terminals 43 and 44 of phase 2 and coils 52, 54, 56 and 58 are connecter to terminals 41 and 42 of phase 1. The coils connected to each phase are in turn divided into two groups, each with a rectifier interposed in connections to the phase terminals, the rectifier polarities being opposite in the two groups. Thus, for a two-phase, eight-coil machine four rectifiers are employed and for a three-phase, twelve-coil machine six rectifiers would be employed.

In the first phase field coils 58 and 54 are connected in series through a rectifier 61. Coils 52 and 56 are connected in series through a rectifier 62 of opposite polarity from the rectifier 61 in such a manner that the magnetic polarity of every second field coil in each phase is reversed; opposite field coils also have opposite magnetic polarity. Likewise, field coils 51 and 55 are connected through rectifier 63 in series to the phase terminals 43 and 44 of the second phase and field coils 53 and 57 are connected in series through rectifier 64 to phase terminals 43 and 44 of the second phase, which is in quadrature with the first phase.

There is a transverse opening 65 in the soft-iron rotor 19 of sufficient size to permit the spring rod 21 to flex slightly when torque is applied to the rotor shell 15. Consequently, even with high frequency excitation there is sufficient relative motion between the rotor shell 15 and the shaft 16 to permit the torque to build up and start the shaft 16 when current is applied to the field coils.

The rotor rotates at a synchronous speed which is a submultiple of what would be synchronous speed for an ordinary eight-pole synchronous machine of the rotating-winding type. The rotation and the torque are produced by the attractive forces at the pole slots, and the pitch is so chosen as to cause the magnetic flux to lock-in at this submultiple synchronous speed. In operation, the rotor 14 advances one rotor slot pitch in one complete electrical cycle. With 34 slots and eight poles the advance is 10.58 degrees (360/34) per cycle—a speed of 707 r.p.m. at 400 cycles per second.

The use of rectifiers in series with the excitation windings of the synchronous inductor type motor has significant valuable advantages. Owing to the fact that the rectifiers block out flux in any pole during the half cycle that a retarding flux would be produced, the machine operates with greater efficiency and with greater mechanical power output for a given frame size and coil size than inductor machines without rectifiers. Moreover, for the rotor teeth to follow the flux variations synchronously when the full current is rectified the rotor must run half as fast during a rectifier half cycle of the flux wave as in the case of a full-wave flux wave and, therefore, the rotor runs half as fast as without the rectifier.

The rectifiers thus cause the synchronous speed to be one-half and the torque per watt to be 170% of torque which would be obtained with simple alternating-current excitation of slotted rotor and pole face type of inductor machinery.

Figure 4:
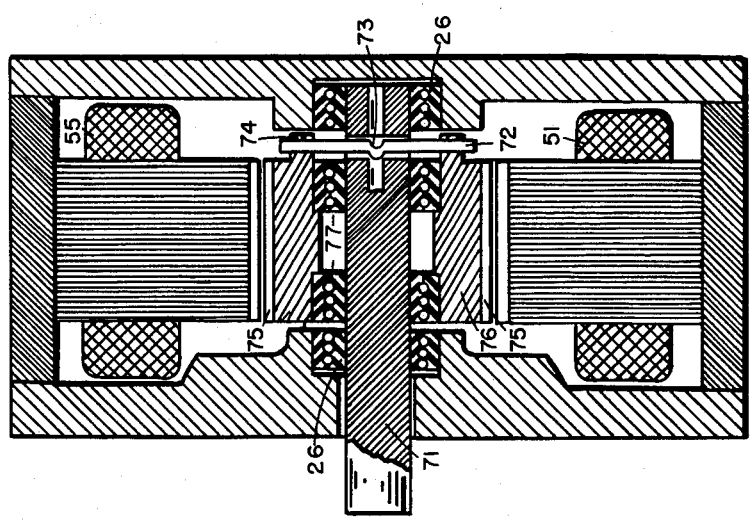
FIG. 4 is a longitudinal sectional view of another embodiment of the invention illustrating a different type of rotor mounting.

Although resilient mounting of the rotor shell 15 upon the shaft 16 is shown in FIG. 1 and FIG. 2, it is to be understood that the invention is not limited thereto and does not exclude the utilization of any suitable mounting construction providing relative motion through a small angle between the rotor and the shaft. For example, as illustrated, in FIG. 4 there is a shaft 71 carrying a cross rod 72 secured in a transverse opening 73 therein and spaced lugs 74 are provided on the rotor 75 which strike the cross rods 72 when the rotor has rotated through a small angle. In the arrangement of FIG. 4 there is a rotor shell 15 slotted in the same manner as illustrated in connection with FIGS. 1 and 2. In this case, however, the rotor shell 15 is carried upon a rotor core 76 which in turn is mounted upon auxiliary bearings 77 carried by the shaft 71. The shaft is supported by main bearings 26 as in the arrangement of FIGS. 1 and 2.

For some types of excitation or control it is desirable to keep the two phases of a two-phase machine isolated for connection to two isolated phases of a supply circuit. As illustrated in FIG. 3, one such phase of the supply circuit is connected to the terminals 41 and 42 and the other of such phases of the supply circuit is connected to terminals 43 and 44. However, where the motor is to be energized by a conventional three-terminal three-phase line, the terminals 41 and 43, shown in FIG. 3, may be connected together to the neutral or common phase terminal of the two-phase supply line.

Figure 5:
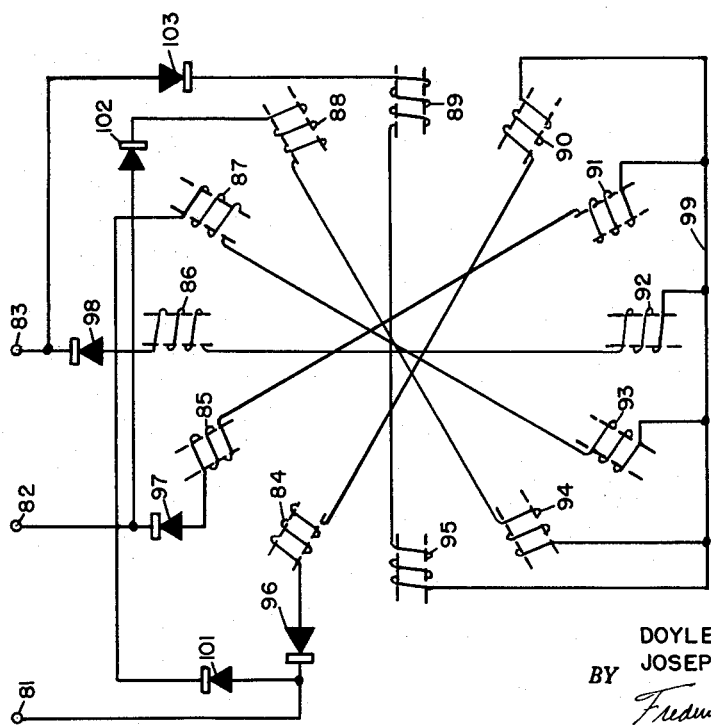
FIG. 5 is a schematic circuit diagram for a three-phase embodiment.

Illustrative connections for a three-phase machine are shown in FIG. 5, where terminals 81, 82 and 83 are provided for connection to a three-phase supply line, and field coils 84, 85, 86, 87, 88, 89, 90, 91, 92, 93, 94 and 95 are provided. As in the arrangement of FIG. 3, the field windings are divided into groups connected to the several phases of the supply circuit. Adjacent windings are connected to successive phases. Winding 84 is connected to phase terminal 81 through a rectifier 96; winding 85 is connected to the phase terminal 82 through rectifier 97 and the winding 86 is connected to terminal 83 through rectifier 98. In the construction illustrated, the oppositely poled windings are 180 physical degrees apart. Opposite windings 84 and 90 are connected in series. Opposite windings 85 and 91 are connected in series and opposite windings 86 and 92 are connected in series, all with a common internal neutral connection 99, which may be brought out if desired.

As a counter part for the windings 84, 85, 86, 90, 91 and 92, the remaining windings have rectifiers connected with opposite polarity. Windings 87 and 93 are connected in series between the phase terminal 81 and the internal neutral line 99 in series with a rectifier 101 poled oppositely to rectifier 96. Likewise, windings 88 and 94 are connected in series between the phase terminal 82 and the common neutral 99 in series with rectifier 102 connected oppositely to the rectifier 97 and windings 89 and 95 are connected in series between phase terminal 83 and the common neutral 99 in series with rectifier 103 poled oppositely to rectifier 98. Thus, the coils 90 physical degrees apart are connected to the same phase terminal but with interposed half-wave rectifiers oppositely poled in the circuits of the windings which are 90 physical degrees apart. For example, windings 84 and 87, which are connected to the phase terminal 81, are 90 physical degrees apart and are connected in series with rectifiers 96 and 101, respectively, which are oppositely poled.

Coils 84 and 90, which are 180 physical degrees apart, are so wound as to be of opposite polarity, that is to produce a North pole on one side of the armature and a South pole on the other side of the armature, at any given instant, which is another way of saying that coils 84 and 90 are 180 electrical degrees apart. It is to be understood that with twice the number of coils, coils such as coils 84 and 90 would be 180 electrical degrees apart but only 90 physical degrees apart. The coils 84 and 87 would be only 22½ physical degrees apart and by analogy coils 84 and 87 might be thought of as being 90 electrical degrees apart since in certain respects there is an analogy to windings of conventional machines spaced 90 electrical degrees.

A significance of the use of half-wave rectifiers is in effect to cause certain characteristics of a difference of 90 electrical degrees between windings connected to the same phase, instead of 180 electrical degrees. When the winding 53, of FIG. 3, for example, causes maximum North polarity winding 55 connected to the same phase as winding 53 through an oppositely poled half-wave rectifier does not cause maximum South polarity but substantially no magnetization at all. This is owing to the fact when the polarity of the alternating-current wave is such as to cause current flowing to the winding 53 and rectifier 64, no current flows through the winding 55 and rectifier 63. Ninety degrees later in the alternating-current wave current flows in neither winding but 180 degrees later in the alternating-current wave the winding 53 causes substantially no magnetization whereas the winding 55 causes maximum South polarity.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A low speed synchronous motor comprising in combination a stator having a plurality of salient poles equalling in number at least four times the number of phases of the system; windings on said poles; polyphase terminals, connections from adjacent windings to successive phase terminals, oppositely poled rectifiers being included in the connections to alternate windings; a rotor having slots with a pitch small in relation to the pole pitch of the salient poles, the salient poles having pole faces with slots of the same pitch as the rotor slots, the spacing between the adjacent pole tips being of the same order of magnitude as the slot pitch, and the pole slots being advanced in the direction of rotation in angular pitch from one pole to the next by a fraction equalling one divided by twice the number of phases.

2. A low speed synchronous motor for a two-phase line comprising in combination two-phase terminals, a stator having a number of salient poles, which number includes eight and multiples of eight, windings on each of said poles, alternate windings being connected to one phase and the remaining windings being connected to the other phase, rectifiers being interposed in the phase connection, with each phase having alternate windings therein connected to rectifiers of opposite polarity, a rotor having slots with a pitch small in relation to the pole pitch of the salient poles, the salient poles having pole faces with slots of the substantially same pitch as the rotor slots, the spacing between the adjacent pole tips being of the same order of magnitude as the slot pitch, and the pole slots being advanced one-fourth pitch from one pole to the next.

3. An inductor motor comprising in combination a field structure having a plurality of salient poles, windings thereon, polyphase terminals, connections from adjacent windings to successive phase terminals, whereby the windings are divided into as many groups as phases of the polyphase terminals, oppositely poled rectifiers being included in connections to alternate windings of each phase group, an armature having slots small in relation to the pole pitch of the salient poles, the salient poles having pole faces with slots of substantially the same pitch as the armature slots, and the pole-face slots being advanced in angular position from one pole to the next by a fraction equalling one divided by twice the number of phases.

4. An inductor motor designed for low speed synchronous operation comprising in combination with a plurality of polyphase terminals, a field structure having a number of poles including four times the number of phases and multiples thereof, windings for each of said poles, connections from adjacent windings to successive phase terminals, the windings 180 electrical degrees apart being connected with opposite polarity, rectifiers interposed in the connections between the phase terminals and the windings, the windings 90 electrical degrees apart having the rectifiers to which they are connected oppositely poled, an armature having slots with a pitch small in relation to the pole pitch, the field structure having pole faces with slots of substantially the same pitch as the armature slots, and the pole slots being advanced in angular phase from one pole to the next by a friction equalling one divided by twice the number of phases.

5. An inductor motor for low speed synchronous operation from a polyphase source of excitation comprising in combination relatively movable magnetizable members each having slots thereon of substantially the same pitch, windings on one of said magnetizable structures so spaced as to form magnetic poles, the windings 180 electrical degrees apart being connected with opposite polarity, half-wave rectifiers interposed in the winding connections with windings 90 electrical degrees apart being connected through oppositely poled rectifiers, the slots in the magnetized field structure being advanced in angular position from one pole to the next by a fraction equalling one divided by twice the number of phases of the source of excitation.

References Cited in the file of this patent

UNITED STATES PATENTS

| | | |
|---|---|---|
| 1,794,618 | Howe | Mar. 3, 1931 |
| 1,959,449 | Stoller | May 22, 1934 |
| 2,103,356 | Fisher | Dec. 28, 1937 |
| 2,105,513 | Welch | Jan. 18, 1938 |
| 2,295,286 | Michelsen | Sept. 8, 1942 |
| 2,497,141 | Schultz | Feb. 14, 1950 |
| 2,703,370 | Steensen | Mar. 1, 1955 |